(12) United States Patent
Miller

(10) Patent No.: US 9,546,897 B1
(45) Date of Patent: Jan. 17, 2017

(54) MODULAR AND REVERSIBLE MANIFOLD ASSEMBLY FOR A PUMP SETTLING GAUGE

(71) Applicant: Kenco International, Inc., Tulsa, OK (US)

(72) Inventor: R. Darrell Miller, Sand Springs, OK (US)

(73) Assignee: Kenco International, Inc., Tulsa, OK (US)

( * ) Notice: Subject to any disclaimer, the term of this patent is extended or adjusted under 35 U.S.C. 154(b) by 103 days.

(21) Appl. No.: 14/590,467

(22) Filed: Jan. 6, 2015

(51) Int. Cl.
*G01F 25/00* (2006.01)

(52) U.S. Cl.
CPC ....... *G01F 25/0007* (2013.01); *G01F 25/0061* (2013.01)

(58) Field of Classification Search
CPC .................... G01F 25/0061; G01F 25/0007
USPC .... 137/1, 255, 266, 15.01, 544, 565.01, 561
See application file for complete search history.

(56) References Cited

U.S. PATENT DOCUMENTS

| | | |
|---|---|---|
| 1,888,542 A | 11/1932 | Roseberg |
| 2,016,926 A | 10/1935 | Josepowitz |
| 5,137,556 A | 8/1992 | Koulogeorgas |
| 5,632,300 A | 5/1997 | Isringhausen |
| 6,347,644 B1 | 2/2002 | Channell |
| 7,255,175 B2 | 8/2007 | Jackson et al. |
| 7,302,958 B2 * | 12/2007 | Worczinski ........... C12C 11/006 137/1 |
| 7,631,662 B2 | 12/2009 | Reck |
| 8,316,886 B2 | 11/2012 | Olsen et al. |
| D705,396 S | 5/2014 | Roden |
| 2013/0284278 A1 | 10/2013 | Winborn |
| 2014/0261848 A1 | 9/2014 | Roden |

\* cited by examiner

*Primary Examiner* — John Fitzgerald
*Assistant Examiner* — Truong Phan
(74) *Attorney, Agent, or Firm* — Head, Johnson & Kachigian, P.C.

(57) ABSTRACT

A modular and reversible manifold assembly for a pump calibration gauge. The assembly includes a tubular body having a first end and an opposed second end. A first inlet connection extends substantially perpendicular to the tubular body. A gauge connection on the first end of the tubular body is provided for connection to a pump calibration gauge. A pump connection on the second end of the tubular body is provided for connection to a metering pump. A second inlet connection extends substantially perpendicular to the tubular body opposed to the first inlet connection wherein either the first or second inlet connection is connected to a liquid storage tank or another modular and reversible manifold assembly.

6 Claims, 5 Drawing Sheets

MODULAR AND REVERSIBLE MANIFOLD ASSEMBLY FOR A PUMP SETTLING GAUGE

BACKGROUND OF THE INVENTION

1. Field of the Invention

The present invention relates to a modular and reversible manifold assembly for a pump setting gauge. In particular, the present invention is directed to a modular and reversible manifold assembly for liquid chemical injection from a liquid storage tank to a metering pump. The manifold assembly is a link between the chemical storage tank, the pump setting gauge and the metering pump.

2. Prior Art

It is sometimes desirable to inject liquid chemical additives from a liquid chemical storage tank or reservoir. The chemical injection may be desirable for various industrial and energy operations. Typically, the liquid chemical additive is moved from the storage tank to the desired application or process by a metering pump which injects the chemical additive in measured amounts over measured durations.

The chemical additives may be used in a variety of applications. Examples include injecting chemical additive to prevent buildup of scale or corrosion in pipelines. Chemical additives may also be injected to prevent ice or hydrates from forming in oil or gas wells during cold weather. Additionally, chemicals may be injected for hydrogen sulfide ($H_2S$) reduction. Additionally, surfactants may be injected to de-liquefy subterranean gas wells. Chemicals may be required in other industrial processes or applications as well.

A pump setting or calibration gauge is often utilized in fluid communication between the liquid storage tank and the pump.

The pump calibration gauge can provide a visual indication of the level of liquid chemical in the storage tank. Additionally, the pump calibration gauge can initially and periodically calibrate or verify the rate of metering pump injection.

Accordingly, it would be desirable to provide a modular and reversible manifold assembly which permits orientation of the component parts in alternative positions for alternative placement of the calibration gauge and the metering pump.

It would also be desirable to provide a modular and reversible manifold assembly to permit multiple manifold assemblies to be connected together so that a single liquid chemical storage tank or reservoir can service multiple applications with multiple metering pump systems that utilize liquid chemical injection.

SUMMARY OF THE INVENTION

The present invention is directed to a modular and reversible manifold assembly to be used with a calibration gauge and a metering pump. The manifold assembly includes a tubular body having a first end and an opposed second end with a fluid passageway therethrough. The first end is connected to the pump setting or calibration gauge.

The second end of the tubular body may be connected to a pump connection for subsequent connection to a metering pump.

Extending substantially perpendicular from the tubular body between the first end and the second end is a first inlet. A second inlet extends substantially perpendicular to the tubular body and is opposed to the first inlet.

The manifold assembly is reversible so that the calibration gauge may be mounted on the left side of the manifold assembly with the metering pump on the right side of the assembly. Alternatively, the calibration gauge may be mounted on the right side of the manifold assembly and the metering pump mounted on the left side of the manifold assembly.

The manifold assembly is also modular in configuration. A first manifold assembly has the first inlet connected to a ball valve and thereafter to the liquid storage tank. An additional ball valve may be threadably connected to the second inlet which is thereafter connected to a second manifold assembly. Again, the orientation of the manifolds is reversible.

DETAILED DESCRIPTION OF THE PREFERRED EMBODIMENTS

Figure 1:
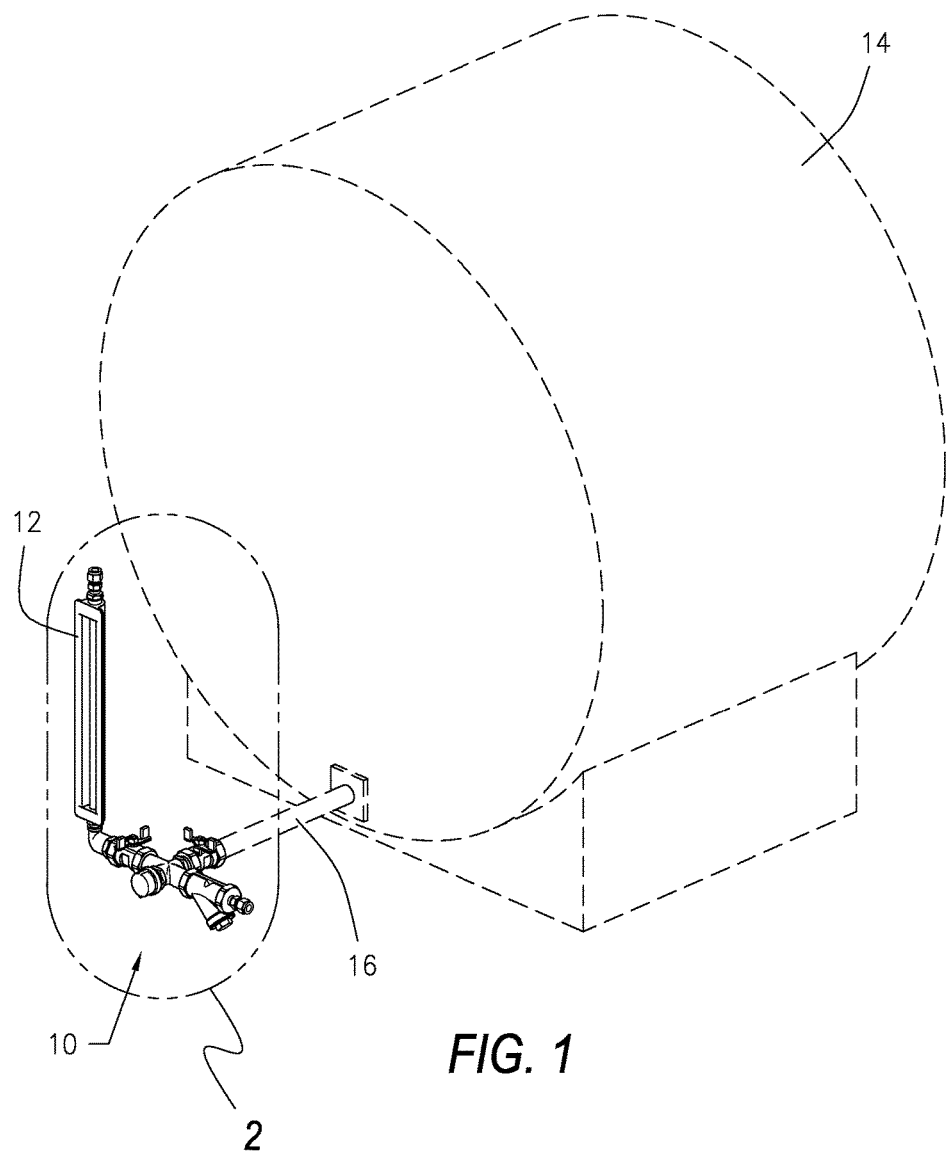
FIG. 1 illustrates a perspective view of a modular and reversible manifold assembly constructed in accordance with the present invention shown with a liquid chemical storage tank in dashed lines.

Referring to the drawings in detail, FIG. 1 illustrates a perspective view of a modular and reversible manifold assembly 10 with a calibration gauge 12 attached thereto constructed in accordance with the present invention. The manifold assembly 10 is connected to and in fluid communication with a liquid chemical storage tank or reservoir 14 (shown in dashed lines) through a line 16.

Figure 2:
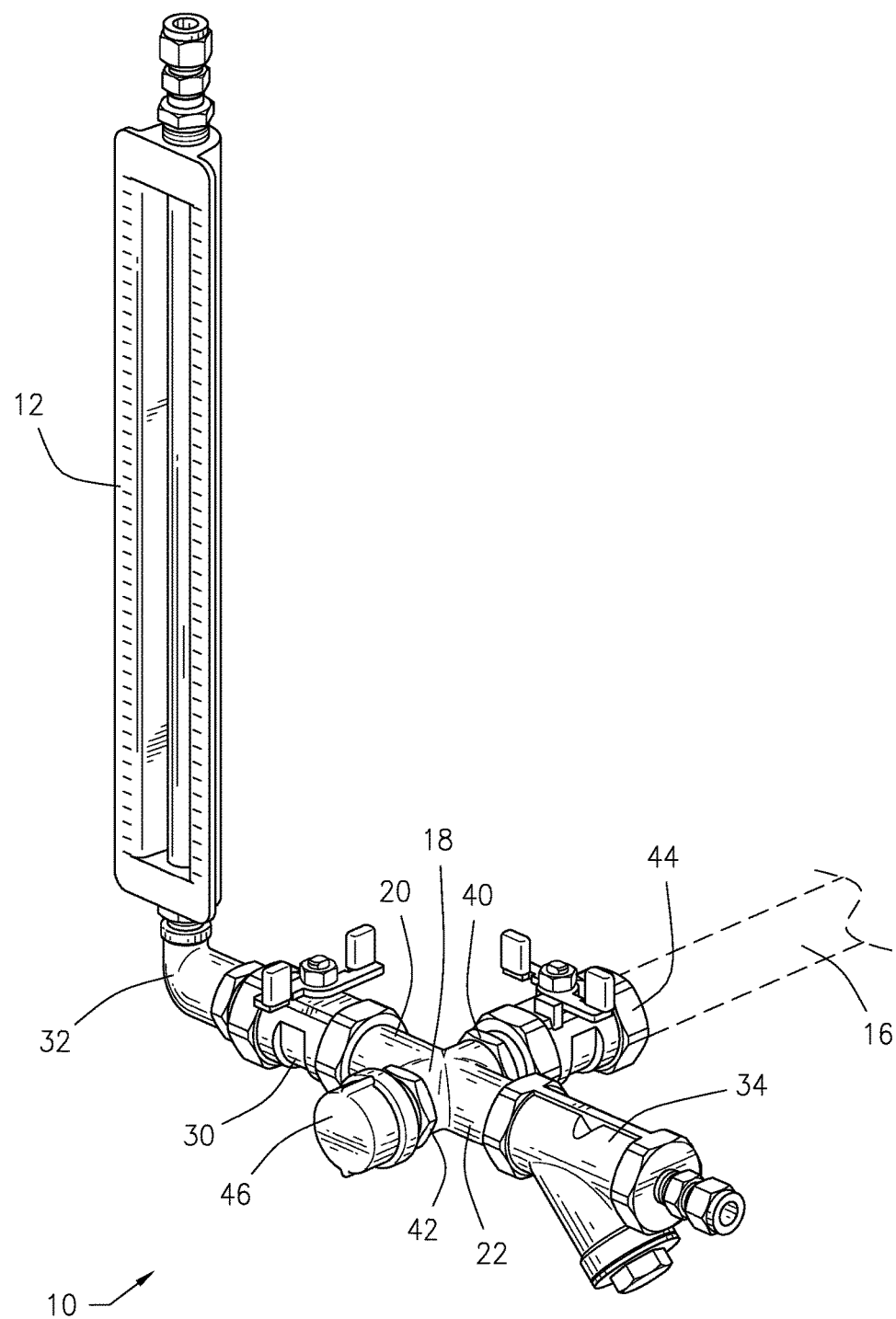
FIG. 2 illustrates an enlarged perspective view of the manifold assembly along with a calibration gauge as shown in FIG. 1.

FIG. 2 illustrates an enlarged, perspective view of the manifold assembly 10 shown in FIG. 1.

The calibration gauge 12 may take various forms including a pump setting gauge with a calibrated sight glass. As will be described herein, the calibration gauge is in fluid communication with the liquid in chemical storage tank 14. The calibration gauge 12 can provide a visual indication of the liquid level contained within the liquid chemical storage tank. Additionally, the calibration or pump setting gauge can calibrate or verify the rate of metering pump injection.

The manifold assembly 10 includes a tubular body 18 having a first end 20 and an opposed second end 22 with a fluid passageway therethrough. The first end 20 of the tubular body 18 may be threaded for connection to the pump calibration gauge 12. In the embodiment shown, the first end 20 is connected to a gauge ball valve 30 which is moveable between an open and closed position. The gauge ball valve 30 is, in turn, connected to an elbow 32 which is subsequently connected to the calibration gauge 12. Accordingly, the calibration gauge 12 is in fluid communication with the chemical storage tank 14.

The second end 22 of the tubular body 18 may include a pump connection 34 for a connection to a metering pump (not shown in FIGS. 1 and 2) to be described herein.

Extending substantially perpendicular from the tubular body 18 between the first end 20 and second end 22 is a first inlet 40. The first inlet 40 is in fluid communication with the tubular body 18. A second inlet 42 extends substantially perpendicular to the tubular body 18 and is opposed to the first inlet 40. The second inlet 42 is in fluid communication with the tubular body 18.

Figure 3:
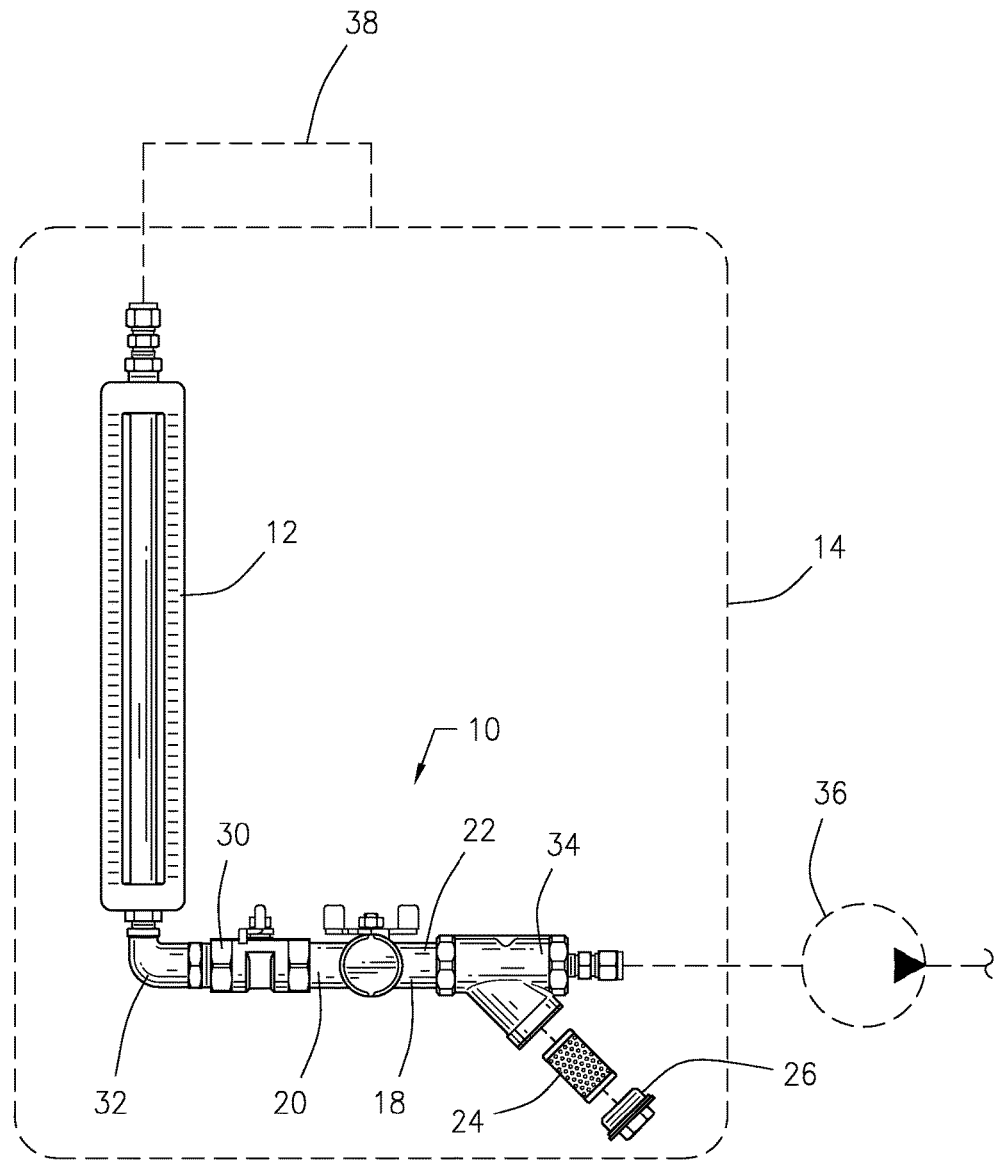
FIG. 3 illustrates a side view of the manifold assembly shown in FIG. 1 with a calibration gauge attached thereto.

FIG. 3 illustrates a side view of the manifold assembly 10 with the chemical storage tank 14 shown in dashed lines and a metering pump 36 shown in dashed lines in communication with the pump connection 34. In the embodiment and configuration shown in FIGS. 1, 2 and 3, the first inlet 40 is threadably connected to a removable manifold ball valve 44, which may be moved between an open and closed position. The manifold ball valve 44 is, in turn, connected to the line 16 for fluid communication with the chemical storage tank 14. The second inlet 42 opposed to the first inlet 40 is threadably connected to and covered by a removable end cap 46.

If the top of the calibration gauge 12 is below the maximum operating level of liquid in the chemical storage tank 14, or if any pressures exist in the system, an equalizing or overflow line 38 may be connected from the calibration gauge 12 to the chemical storage tank 14.

Once the manifold assembly 10 and the calibration gauge 12 have been connected as described herein, the rate of metering pump injection can be calibrated or verified. In order to check the chemical pump flow rate, the gauge ball valve 30 is placed in the open position to allow liquid from the chemical storage tank 14 to fill the calibration gauge 12. Thereafter, the manifold ball valve 44 will be closed for one minute or another time period to allow the metering pump 36 to draw liquid from the calibration gauge 12. The liquid level height change in the calibration gauge 12 will be noted. Thereafter, the manifold ball valve 44 will be reopened allowing liquid to flow from the chemical storage tank 14 to the metering pump 36. The liquid level height change and the calibration gauge 12 scale increments represent the metering pump 36 flow rate. Flow rates can be measured in various increments such as quarts per day or liters per day—depending on the type of calibration gauge 12.

During use of the liquid additive system, liquid is delivered from the chemical storage tank 14, through the manifold ball valve 44, through the manifold assembly 10 including the pump connection 34 and then to the metering pump 36.

The pump connection 34 may include a strainer 24 arranged at an acute angle to the tubular body 18 covered by a threaded end cap 26 for trapping particulate matter to prevent it from entering the metering pump 36. The end cap 26 may be periodically removed to clean out trapped particulate matter.

It will be appreciated that the pump connection 34 as well as the gauge ball valve 30 may be integral with the body 18.

Figure 4:
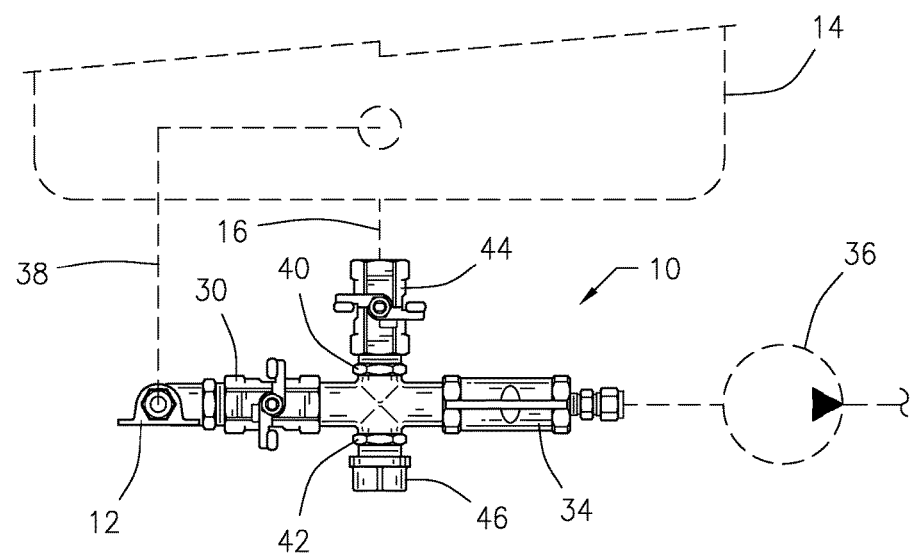
FIG. 4 illustrates a top view of the manifold assembly shown in FIGS. 1, 2 and 3.
Figure 5:
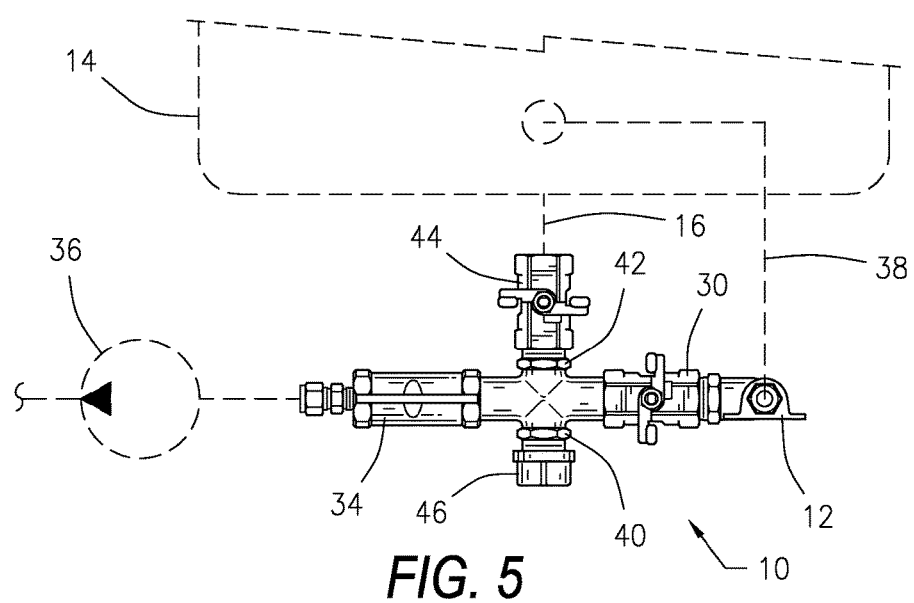
FIG. 5 illustrates a top view of the manifold assembly configured in a reverse orientation from that shown in FIG. 4.

FIGS. 4 and 5 show top views of alternate mounting orientations of the manifold assembly 10. FIG. 4 illustrates the manifold assembly 10 arrangement or orientation shown in FIGS. 1, 2 and 3 with the calibration gauge 12 on the left side of the manifold assembly 10 and the metering pump 36 on the right side of the manifold assembly 10.

The placement of the calibration gauge 12 and of the metering pump 36 may be dictated by conditions in the field. The manifold assembly 10 may be reversed as shown in FIG. 5. The second inlet 42 is connected to the manifold ball valve 44 and thereafter to the line 16 and then to the chemical storage tank 14. The first inlet 40 is closed and covered by the removable end cap 46. In the configuration shown in FIG. 5, the metering pump 36 is on the left side, while the calibration gauge 12 is on the right side.

Accordingly, a single manifold assembly 10 may be reversed depending on the desired configuration.

Figure 6:
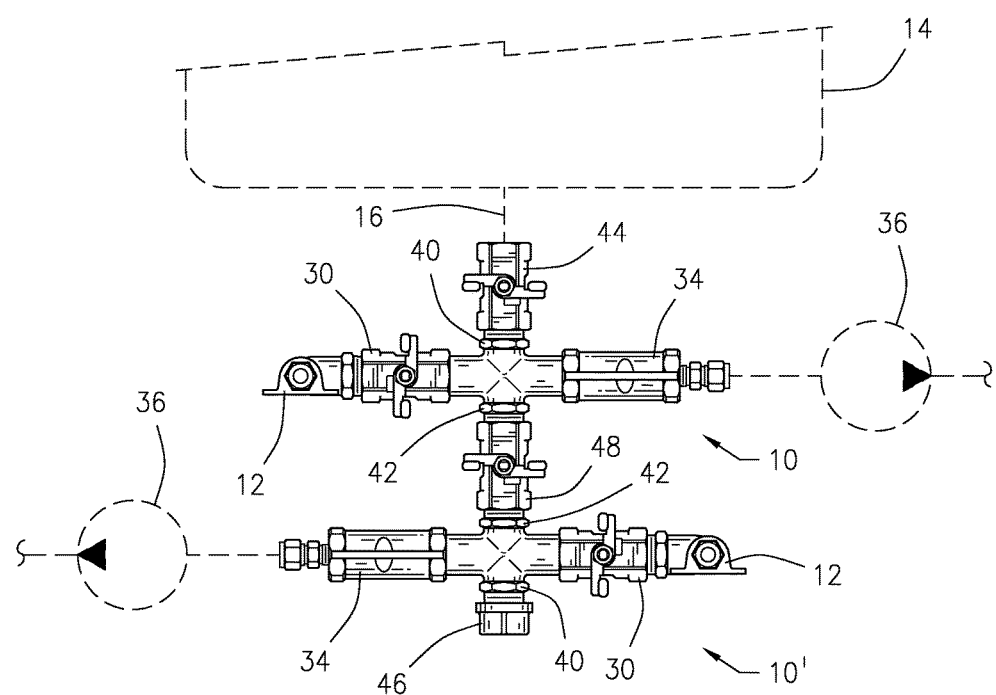
FIG. 6 illustrates the manifold assembly along with a second manifold assembly for delivery of liquid chemical additives from a single storage tank to more than one application.

FIG. 6 illustrates a top view showing the modular nature of the manifold assembly 10. In some situations, more than one manifold assembly 10 may be utilized to deliver liquid chemical additives from a single chemical storage tank 14 to different applications.

As shown in FIG. 6, a first manifold assembly 10 has the first inlet 40 connected to the manifold ball valve 44 and thereafter to the line 16 and then to the chemical storage tank 14 as shown in FIGS. 1, 2, 3 and 4. An additional manifold ball valve 48, same as manifold ball valve 44, is threadably connected to the second inlet 42 which is thereafter connected to a second manifold assembly 10'. The ball valve 48 is threadably connected to the second inlet 42 of the second manifold assembly 10'. The removable end cap 46 is threadably secured to the first inlet 40.

Accordingly, the manifold assembly 10 of the present invention is modular. It should be noted in FIG. 6 that first or second manifold assembly 10 can be oriented in either direction and is not limited to two manifolds.

Whereas, the present invention has been described in relation to the drawings attached hereto, it should be understood that other and further modifications, apart from those shown or suggested herein, may be made within the spirit and scope of this invention.

What is claimed is:

1. A modular and reversible manifold assembly for a pump calibration gauge, which assembly comprises:

an elongated tubular body having a longitudinal axis and having a first end opening and an opposed second end opening;

a first inlet opening connection extending substantially perpendicular to said longitudinal axis of said tubular body, said first inlet opening connection between said first end opening and said second end opening of said tubular body;

a calibration gauge connection on said first end opening of said tubular body for connection to a pump calibration gauge;

a metering pump connection on said second end opening of said tubular body for connection to a metering pump, wherein said metering pump connection includes a strainer for collection of solid debris and a removable strainer plug, and wherein said tubular body, said first inlet opening connection and a second inlet opening connection define a plane and wherein said strainer and said removable strainer plug are at an acute angle to said plane; and said second inlet opening connection extending substantially perpendicular to said longitudinal axis of said tubular body and opposed to said first inlet opening connection, said second inlet opening connection between said first end opening and said second end opening of said tubular body wherein said first inlet opening connection and said second inlet opening connection are interchangeable so that the entire assembly is reversible and wherein either said first inlet opening connection or said second inlet opening connection is capable of connection to a liquid chemical storage tank.

2. A modular and reversible manifold assembly for a pump calibration gauge as set forth in claim 1 including a removable inlet connection ball valve and a removable inlet connection cap.

3. A modular and reversible manifold assembly for a pump calibration gauge as set forth in claim 1 wherein said calibration gauge connection of said first end opening is threadably connected to an elbow for subsequent connection to said pump calibration gauge.

4. A modular and reversible manifold assembly for a pump calibration gauge as set forth in claim 1 wherein said calibration gauge connection of said first end opening includes a ball valve.

5. A modular and reversible manifold assembly for a pump calibration gauge as set forth in claim 1 wherein said first inlet opening connection is threaded and wherein said second inlet opening connection opposed to said first inlet opening connection is threaded.

6. A modular and reversible manifold assembly for a pump calibration gauge as set forth in claim 1 wherein either said first inlet opening connection or said second inlet opening connection is connected to an additional manifold assembly.

* * * * *